US009222596B2

(12) United States Patent
Maljanian et al.

(10) Patent No.: US 9,222,596 B2

(45) Date of Patent: Dec. 29, 2015

(54) FAULT TOLERANT AIRFLOW CONTROL SYSTEM

(71) Applicant: Hamilton Sundstrand Corporation, Windsor Locks, CT (US)

(72) Inventors: John M. Maljanian, Farmington, CT (US); Bruce R. Schroeder, Agawam, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 311 days.

(21) Appl. No.: 13/914,973

(22) Filed: Jun. 11, 2013

(65) Prior Publication Data

US 2014/0361202 A1 Dec. 11, 2014

(51) Int. Cl.

| | |
|---|---|
| ***F16K 31/124*** | (2006.01) |
| ***F16K 31/42*** | (2006.01) |
| ***G05D 7/01*** | (2006.01) |
| ***G05D 16/10*** | (2006.01) |

(52) U.S. Cl.

CPC ............... *F16K 31/124* (2013.01); *F16K 31/42* (2013.01); *G05D 7/0153* (2013.01); *G05D 7/0186* (2013.01); *G05D 16/106* (2013.01); *Y10T 137/7761* (2013.01); *Y10T 137/7764* (2013.01)

(58) Field of Classification Search

USPC ................. 137/487.5, 489, 489.5; 251/30.02, 251/30.01

See application file for complete search history.

(56) References Cited

U.S. PATENT DOCUMENTS

| | | | | |
|---|---|---|---|---|
| 2,412,490 | A * | 12/1946 | Biggle | 137/505.12 |
| 2,958,503 | A * | 11/1960 | Vaughn | 251/30.02 |
| 3,477,466 | A * | 11/1969 | Sturm | 137/601.13 |
| 4,898,200 | A * | 2/1990 | Odajima et al. | 137/85 |
| 5,230,362 | A * | 7/1993 | Goodman | 137/489 |
| 6,227,247 | B1 * | 5/2001 | Abel | 137/625.62 |
| 6,892,745 | B2 * | 5/2005 | Benson | 137/1 |
| 2013/0284954 | A1 * | 10/2013 | Stradinger et al. | 251/30.01 |

* cited by examiner

*Primary Examiner* — Kevin Murphy

*Assistant Examiner* — Jonathan Waddy

(74) *Attorney, Agent, or Firm* — Cantor Colburn LLP

(57) ABSTRACT

An airflow control system for controlling pressure and flow through a flow passage with an upstream portion and a downstream portion includes a valve actuator which receives electrical signals to control the opening and closing of the valve that is configured and arranged such that the system may operate in the event of loss of power.

10 Claims, 3 Drawing Sheets

Latching Solenoid
Pre-Cooler
Ps
Pfb
Pm
Fclose
Fopen
Open
Au
Pamb
Pvo
A

FAULT TOLERANT AIRFLOW CONTROL SYSTEM

BACKGROUND OF THE INVENTION

The subject matter disclosed herein relates to airflow control and, more particularly, to an aircraft airflow system that operates during a power failure condition.

Bleed systems on aircraft generally involve taking air from the aircraft engine, and regulating it down to a usable temperature and pressure. Pressure is usually regulated through valves, such as butterfly valves being opened certain amounts from zero to ninety degrees, to decrease or increase pressure downstream of the valve. The valves are generally either a proportional valve or an integrating valve, and can be controlled either pneumatically or electronically.

Pneumatic control is done through physical components, flow passages, levers, etc. Electronic controls control the valve through electrical signals. In particular, an electronically controlled proportional valve is generally operated by receiving an electrical control signal which corresponds to a valve position. An electronically controlled integrating valve is controlled with an electrical signal that corresponds to a valve velocity, causing the valve to open or close due to the valve travelling at a velocity for a certain amount of time.

It is desirable to maintain stable pressures in the bleed system to improve performance and decrease wear on the system. This includes resisting cycling and input disturbances in the system. Cycling is when pressure values downstream of the valve cycle throughout a range of pressures, to average out to the desired pressure. For example, if the desired pressure is 45 psig, but it is cycling from 40 psig to 50 psig to get an average of 45 psig, that cycling creates a lot of extra wear on system components from the constant fluctuations. The cycling can be due in part to frictional forces that must be overcome to open or close the valve. Overcoming the frictional forces can result in a backlash of force due to the larger amount of force needed to overcome the initial frictional forces to initiate valve movement. After the initial frictional forces are overcome, the valve can move very rapidly, which can turn into cycling if movement is too rapid and the desired target is overshot. Input disturbances (which can initiate cycling) come from things such as a change in throttle which causes a power change in the engine. Throttling up the engine can cause the pressure to quickly and dramatically change. The bleed system then responds to this rapid change, trying to regulate the pressure to a stable, usable level once again.

In some systems, valves are configured to fail to either a fully open or fully closed state upon loss of power. This results in an inability to accurately regulate system supply pressure in some instances.

BRIEF DESCRIPTION OF THE INVENTION

Disclosed is an airflow control system for controlling pressure and flow through a flow passage with an upstream portion and a downstream portion. The system includes a valve which can open to different positions for controlling pressure at a downstream portion of the flow passage and a valve actuator which receives electrical signals to control the opening and closing of the valve. The valve actuator includes: a first cylinder; a first piston with a first side and a second side for moving through the first cylinder; a second cylinder connected to the first cylinder; a second piston with a first side and a second side for moving through the second cylinder, and connected to the first piston to move with the first piston; a first pressure chamber defined by the first cylinder and the first side of first piston; a second pressure chamber defined by the second side of the first piston and the first side of the second piston; a third pressure chamber defined by the second cylinder and the second side of the second piston; a torque motor to control pressure in the first pressure chamber to move the first piston by modulating a restrictor to allow pressure to flow out of the first pressure chamber into an area of ambient pressure, the torque motor configured to prevent flow from the first pressure into the area of ambient air in the event that the torque motor is not receiving power. The system also includes an actuator flow passage connecting the upstream portion of the flow passage to the torque motor and to the third pressure chamber to supply pressure to the torque motor and to the third pressure chamber. The system also includes an actuator shaft connecting the valve to the first piston and the second piston to translate movement of the first piston and the second piston into a change of the valve position and a pneumatic feedback system to stabilize the valve actuator.

DETAILED DESCRIPTION OF THE INVENTION

Figure 1:
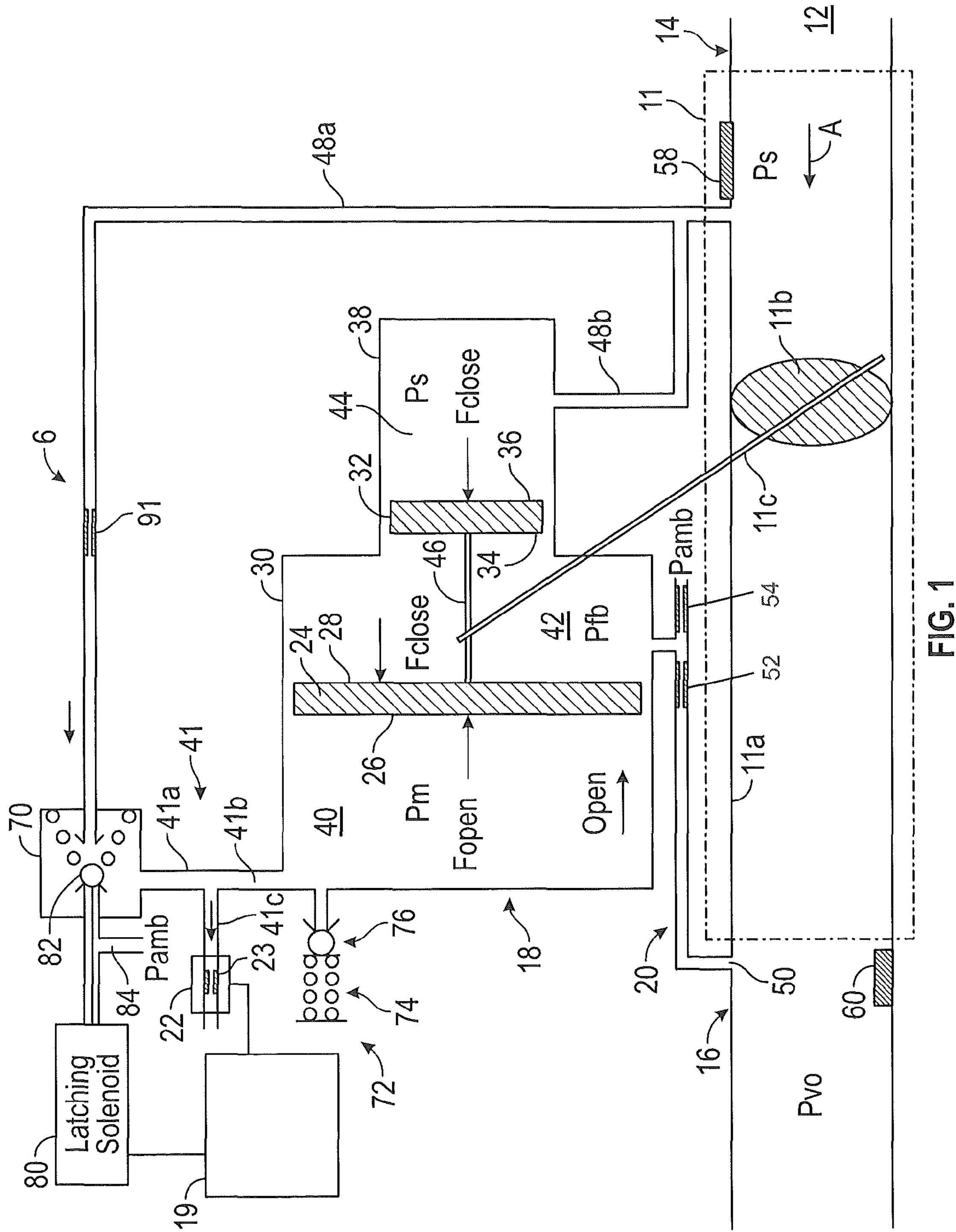
FIG. 1 is a block diagram of a valve according to a first embodiment of the current invention.

FIG. 1 is a block diagram of a valve 6 according to a first embodiment of the current invention. In this embodiment, the valve 6 includes a valve actuator 18 that drives the operation of a butterfly valve 11 (with valve housing 11*a*, disk 11*b* and shaft 11*c*). The valve 11 is positioned along a flow passage 12 with upstream portion 14 and downstream portion 16. In operation, bleed air travels though the flow passage 12 in the direction shown by arrow A. In the upstream portion 14, the air has a supply pressure, $P_s$, The downstream portion 16 receives air that passes through the valve 11 and that is at a valve outlet pressure referred to herein at $P_{vo}$.

Butterfly valve 11 sits in flow passage 12 and disc 11*b* can rotate between zero and ninety degrees. First piston 24 sits in first cylinder 30. Second piston 32 sits in second cylinder 38. First piston 24 is attached to second piston 32 by connection rod 46. Shaft 11*c* connects disc 11*b* to connection rod 46.

The actuator 18 is fluidly coupled to a pneumatic feedback system 20. Valve actuator 18 includes torque motor 22 with modulating flow restrictor 23, first piston 24 (with first side 26 and second side 28) in first cylinder 30, second piston 32 (with first side 34 and second side 36) in second cylinder 38, first pressure chamber 40 with flow passage 41, second pressure chamber 42, third pressure chamber 44, connection rod 46, and actuator flow passages 48*a*, 48*b*. Pneumatic feedback system 20 includes feedback flow passage 50 with flow restrictions 52 and 54.

In the illustrated embodiment, the flow passage 41 includes two portions, 41*a* and 41*b*. Disposed between these passages is an outlet passage 41*c*. Flow through the outlet passage is controlled by torque motor 22. In one embodiment, the torque motor 22 is a two-way torque motor that controls the position of flow restrictor 23.

The actuator 18 also includes a regulator 72 that is in fluid communication with the first pressure chamber 40. The regulator 72 as illustrated includes a spring 74 that exerts a pressure on a ball 76 that keeps fluid from exiting the first pressure chamber 40 during normal operation. To that end, the spring 74 may be selected such that is exerts more force (pressure) than is expected in the first pressure chamber 40. In one example, the typical pressure expected in the first pressure chamber 40 during normal operation is about 40-50 psig. Thus, in this example, the regulator 72 is set to remain closed at pressures below, for example, 55 psig. Of course, other pressures could be utilized. While the regulator 72 is shown as being a spring loaded element, it shall be understood that any type of regulator can be utilized.

Figure 2:
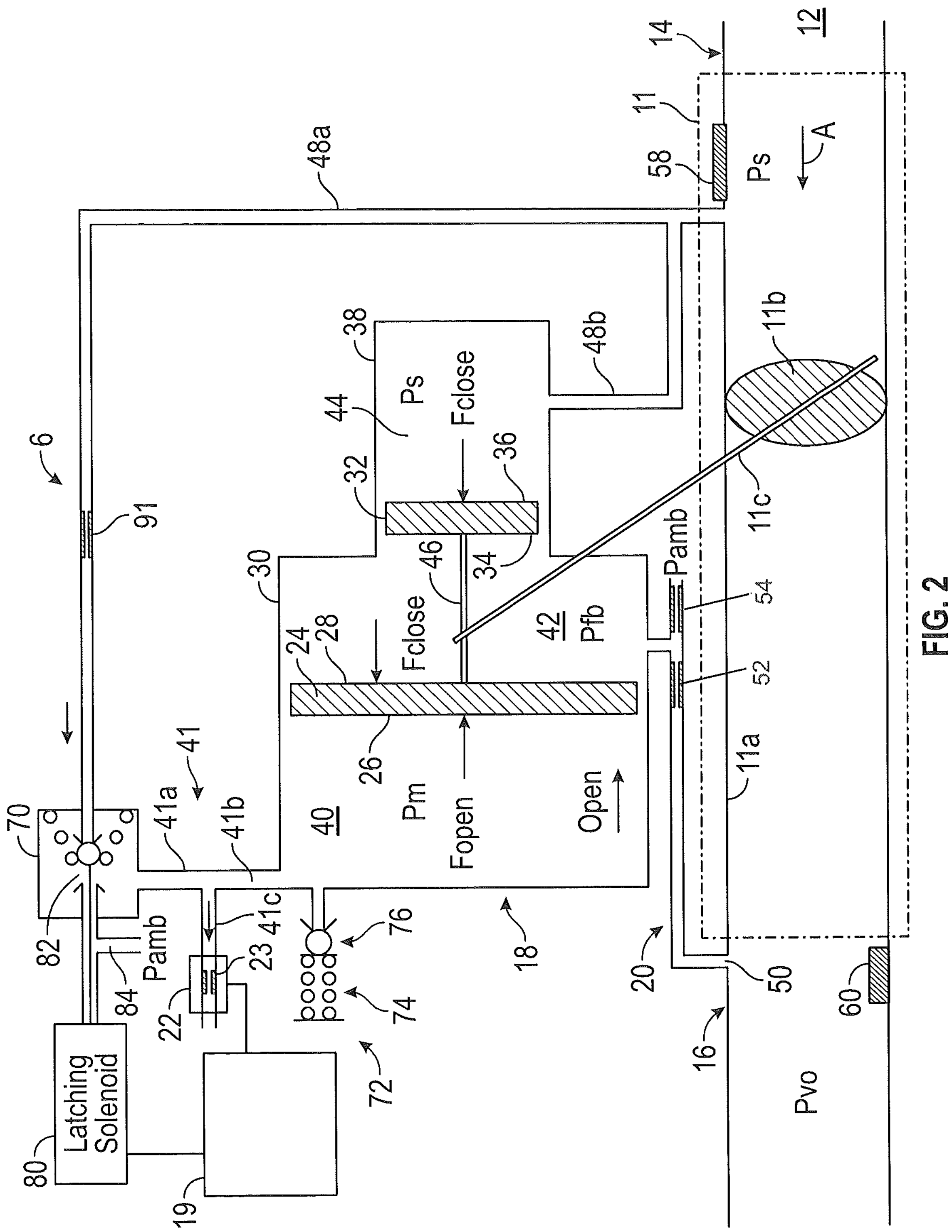
FIG. 2 is a block diagram of the valve of FIG. 1 in a second operating orientation.

Flow passage 48*a* connects upstream portion 14 of flow passage 12 at $P_s$ to the inlet of a solenoid controlled ball valve 70. In the embodiment illustrated in FIG. 1, the solenoid controlled ball valve 70 is shown in the "open" position in which it allows a fluid (e.g., air) to pass from the flow passage 48*a* to flow passage 41*a*. As illustrated in FIG. 2, the solenoid controlled ball valve 70 is shown in the "closed" position. In this position, the latching solenoid 80 has been activated driving the ball 82 to close flow passage 48*a* and fluid is allowed to exit the system 6 to ambient air via solenoid outlet 84.

The system 6 also includes control system 19 that controls the position of the torque motor 22 and the state of latching solenoid 80.

Valve actuator 18 works to rotate valve disk 11*b* to positions between zero degrees (fully closed) and ninety degrees (fully open) to regulate pressure in the downstream portion 16 of flow passage 12. Rotation is achieved through shaft 11*c* translating movement of first piston 24 and second piston 32 to rotate valve disk l lb via a lever arm or any other suitable mechanism for translating linear (axial) movement into rotation movement known in the art. First piston 24 and second piston 32 move together (due to connection rod 46), with first piston 24 moving through first cylinder 30 and second piston 32 moving through second cylinder 38. First piston 24 and second piston 32 move through cylinders 30, 38 due to respective pressures in first pressure chamber 40, second pressure chamber 42 and third pressure chamber 44. Pressure in first pressure chamber 40 acts on first side 26 of first piston 24. Pressure in first pressure chamber 40 acts an opening force for valve disk 11*b*. Pressure in second pressure chamber 42 acts on second side 28 of first piston 24 more so than first side 34 of second piston 32 due to the larger surface area of first piston 24. Pressure in second pressure chamber 42 acts as a closing force on valve disk 1 lb. Pressure in third pressure chamber 44 acts on second side 36 of second piston 32, and acts as a closing force on valve disk 11*b*. Pressure in third pressure chamber 44 comes from flow passage 48*b* which feeds pressure from upstream portion 14 of flow passage 12 to third pressure chamber 44.

Pressure in the first pressure chamber 40 is regulated by torque motor 22 as well as flow restrictor 91. The combination of flow restrictor 91 and the variable flow restrictor 23 of torque motor 22 allows for control of the pressure in the pressure chamber 40.

Torque motor 22 receives pressure from upstream portion of flow passage 12 through flow passage 48*a* when the solenoid controlled valve 70 is in the open position. Torque motor 22 then adjusts the size of flow restrictor 23 to affect a flow area (also generally referred to by reference numeral 23) in accordance with whether it is trying to close or open valve 11. If torque motor 22 is acting to open valve 11, it will increase pressure in first pressure chamber 40. It will do this by decreasing flow area of restrictor 23. This will increase pressure in first pressure chamber 40 by forcing pressurized flow from flow passage 48*a* into first pressure chamber 40 via flow passages 41*a* and 41*b*. This will increase force on first side 26 of first piston 24, causing first piston 24 (and second piston 32) to move. Shaft 11 c will translate that movement of pistons 24, 32 into rotation to open valve disk 11*b*. In particular, a lever arm coupled to one of the pistons 24, 32 may translate axial motion of the piston assembly 24, 32 into a rotary motion of shaft 11*c*. If torque motor 22 is acting to close valve, it will decrease pressure in first pressure chamber 40 by increasing flow area through flow restrictor 23 (which flows to an area of ambient air pressure). This will decrease pressure in first pressure chamber 40, allowing pressure in second pressure chamber 42 and third pressure chamber 44 to act as closing forces, moving first piston 24 and second piston 32, with shaft 11*c* translating that movement into a closing rotation for valve disk 11*b*.

Valve actuator 18 is controlled by electronic control system 19. Upstream pressure sensor 58 senses pressure in upstream portion 14 of flow passage 12 and sends a signal indicating the pressure at that point to control system 19. Control system 19 then sends an electrical signal in the form of current to torque motor 22 based on the pressure signal received from upstream pressure sensor 58 and the desired downstream pressure. Current sent to torque motor 22 causes torque motor 22 to modulate flow restrictor 23 to either increase or decrease pressure in first pressure chamber 40 based on whether the upstream pressure indicates that valve 11 should be opened or closed (as described above). Downstream pressure sensor 60 then senses the pressure in downstream portion 16 of flow passage 12 and sends a signal to control system 19. Control system 19 registers this to determine if control signal sent to torque motor 22 needs to vary to cause valve to open or close to achieve the desired downstream pressure. This electronic control loop is continuous, always trying to achieve a steady, desired pressure value in downstream portion 16 of flow passage 12.

Pneumatic feedback system 20 uses flow passage 50, connected to downstream portion 16 of flow passage 12, to provide pneumatic feedback to valve actuator 18 and to stabilize the position of valve disk 11*b*. Flow passage 50 feeds a feedback pressure ($P_{fb}$) the downstream pressure to second pressure chamber 42. Flow passage 50 can be connected to downstream portion 16 of flow passage either within or outside (as illustrated) butterfly valve housing 11*a*. Flow restrictions 52 and 54 are set in flow passage 50 to decrease the pressure into second pressure chamber 42 from $P_{vo}$ to $P_{fb}$, to ensure that pressure flowing into second pressure chamber 42 is coupled to downstream pressure, but also some amount less than pressure in downstream portion 16. Pressure in second pressure chamber 42 acts as a closing force on valve 11, and should be some amount less than the pressure in downstream portion 16 of flow passage 12 to allow for full opening of valve 11 when desired. Delivering downstream pressure to second pressure chamber 42 helps to slow the movement of first piston 24 and second piston 32, therefore slowing valve disk 11*b* movement. This slowing of the movement stabilizes valve disk 11*b* and prevents overshoots which may otherwise lead to cycling. Feeding downstream pressure into second pressure chamber 42 also acts as a pneumatic feedback for valve actuator 18 by coupling downstream pressure to pressure in valve actuator 18. For example, if valve actuator 18 is trying to increase downstream pressure, control system 19 would send a signal to torque motor 22 which modulates applicable flow area 23 to increase pressure in first pressure chamber 40. Increased pressure in first pressure chamber 40 would cause first piston 24 (and second piston 32) to move, and shaft 11*c* would translate that movement into an opening force for the valve. However, if valve disk 11*b* opened too much, causing too great of an increase in pressure in downstream portion 16, that pressure (with a slight drop due to restrictions 52 and 54) would be fed back into second pressure chamber 42 and act as a closing force on valve actuator 18.

Actuator 18 with pneumatic feedback system 20 and electronic control system 19 allows for valve 11 to be lightweight, stable, and able to resist input disturbances. This is due to the pneumatic coupling of valve position with pressure in downstream portion 16 of flow passage 12. Pneumatic feedback system 20 works to pneumatically couple downstream pressure to valve disk 1 lb movement, ensuring system 6 can more stably and more accurately achieve a desired pressure in downstream portion 16 of flow passage 12. Pneumatic feedback system 20 also works to slow opening and closing movements of valve disk 11*b*, therefore reducing overshoot which result in cycling due to frictional forces, input disturbances or other stability issues.

Additionally, pneumatic feedback system 20 assists in keeping valve 11 controllable despite valve actuator 18 being small and lightweight. This is due to pneumatic feedback 20 introducing additional force into second pressure chamber 42, to counteract backlash due to frictional forces and other sudden changes which could result in less stable control. In some past systems, valve actuator 18 was made larger to overcome frictional forces and backlash when changing valve position. The current invention overcomes the destabilizing effects of frictional forces by using pneumatic feedback, allowing for economical and flexibility advantages of having a smaller valve actuator 18 while still having the improved controllability of larger valve actuators.

The above system works as described above and is effective when power is present to control the operation of the toque motor 22. In typical systems, the torque motor 22 is wired such that in the event of loss of power, it fully opens the flow restrictor 23. In one embodiment, in the event of power loss, the torque motor 22 is wired such that it closes flow restrictor 23. In this manner, the actuator 18 will continue to operate even in the event of a loss of power. However, in the event that pressure needs to be reduced in the first pressure chamber 40, the regulator 72 that is in fluid communication with the first pressure chamber 40 will relieve pressure in the first chamber 40 if the pressure exceeds the closing force of the regulator 72. As discussed above, the closing force of the regulator 72 may be chosen so that it is higher than the typical pressure controlled in the first chamber 40. Thus, while it does not work exactly as if the power is being supplied, to a close approximation, the system 6 may operate even in the absence of power.

Additionally, the latching solenoid 80 can be utilized to disable the system 6 if that is desired. For example, if power is lost, the pilot may still command the solenoid 80 to move ball 82 to a position where air from the first chamber 40 is allowed to exit. This results in the closing of butterfly valve 11. The control of the latching solenoid can be provided by the control system 19, another input or both.

Figure 3:
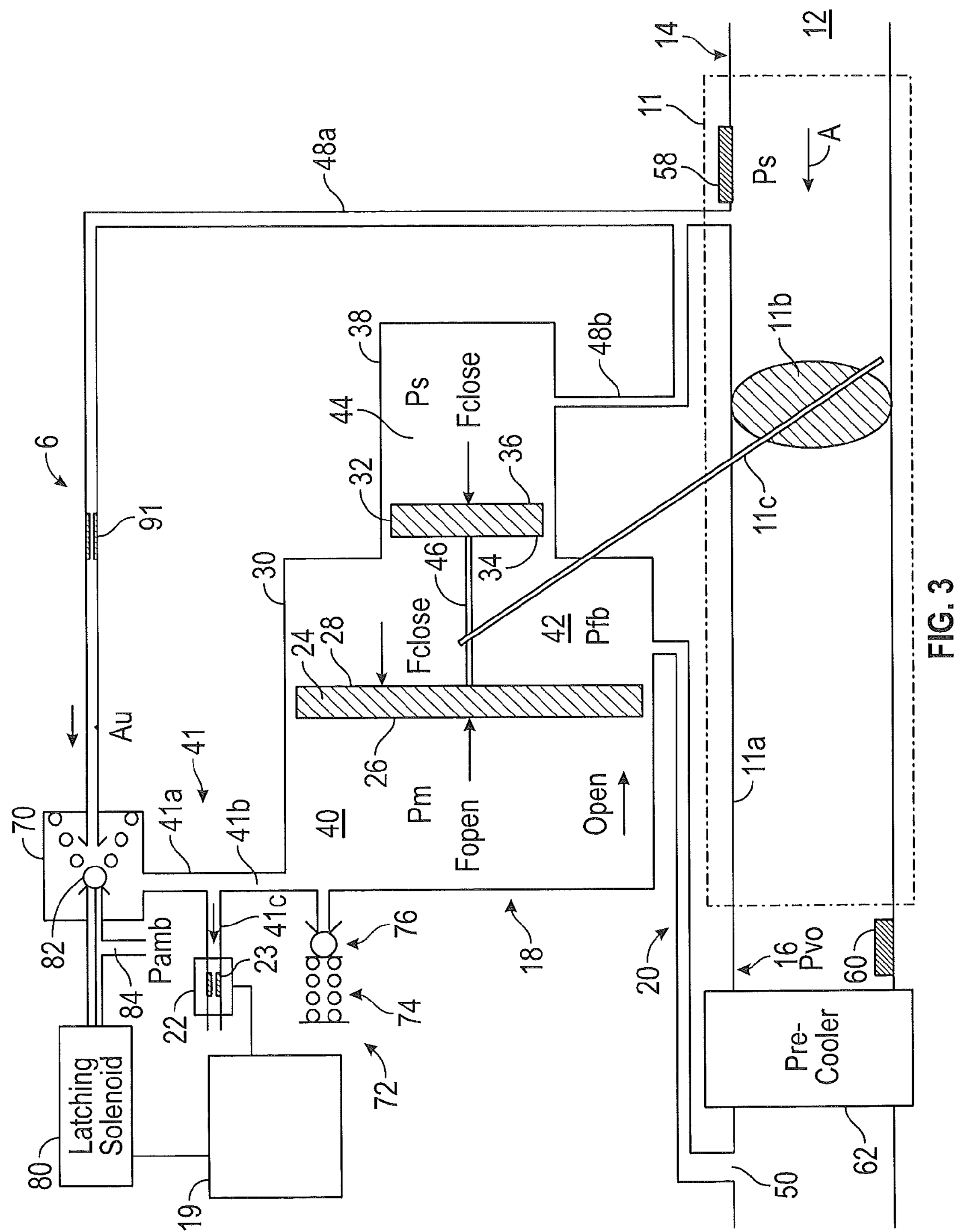
FIG. 3 is a block diagram of a valve according to a second embodiment of the current invention.

FIG. 3 is a block diagram of a valve according to a second embodiment of the current invention. FIG. 3 works much the same way as in FIG. 1 and includes similar components. Valve actuator 18 works much like valve actuator 18 in FIGS. 1 and 2 to open and close valve 11 to regulate pressure in downstream portion 16 of flow passage 12. Valve actuator 18 opens and closes valve 11 through moving first piston 24 and second piston 32 by torque motor 22 changing pressure in first pressure chamber 40 through modulating flow area 23. Pre-cooler heat exchanger 62 creates a pressure drop in downstream portion 16 of flow passage 12. The drop creates the difference between $P_{vo}$ and $P_{fb}$. The pressure after this pressure drop is then supplied to second pressure chamber 42 to give valve actuator 18 pneumatic feedback, coupling downstream pressure with valve actuator 18 pressure. This can slow valve disk l lb movement by slowing movement of first and second pistons 24, 32. It shall be understood that in the embodiment shown in FIG. 2, flow restrictors 52 and 54 described above may be omitted. While a pre-cooler heat exchanger 62 is shown, any component which results in a downstream pressure drop could be used, including bends, venturis, etc.

One of skill in the art, based on the teachings herein, will realize that the valves disclosed herein may meet one or more of the following conditions in the event that power is lost to an engine bleed system: 1) If the bleed system was commanded on prior to loss of electrical power, the bleed system shall remain operable after loss of power; 2) If the bleed system is turned off after power loss, the bleed system shall shut down and remain latched off; and 3) If the bleed was commanded off prior to loss of power then the bleed shall remain off after loss of power.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airflow control system for controlling pressure and flow through a flow passage with an upstream portion and a downstream portion, the system comprising:

a valve which can open to different positions for controlling pressure at the downstream portion of the flow passage;

a valve actuator which receives electrical signals to control the opening and closing of the valve, the valve actuator including:

a first cylinder;

a first piston with a first side and a second side for moving through the first cylinder;

a second cylinder connected to the first cylinder;

a second piston with a first side and a second side for moving through the second cylinder, and connected to the first piston to move with the first piston;

a first pressure chamber defined by the first cylinder and the first side of first piston;

a second pressure chamber defined by the second side of the first piston and the first side of the second piston;

a third pressure chamber defined by the second cylinder and the second side of the second piston;

a torque motor to control pressure in the first pressure chamber to move the first piston by modulating a restrictor to allow pressure to flow out of the first pressure chamber into an area of ambient pressure, the torque motor configured to prevent flow from the first pressure chamber into the area of ambient air in the event that the torque motor is not receiving power;

an actuator flow passage connecting the upstream portion of the flow passage to the torque motor and to the third pressure chamber to supply pressure to the torque motor and to the third pressure chamber; and an actuator shaft connecting the valve to the first piston and the second piston to translate movement of the first piston and the second piston into a change of the valve position; and a pneumatic feedback system to stabilize the valve actuator.

2. The system of claim 1, further comprising:

a pressure regulator that allows pressure to flow out of the first chamber in the event that a pressure in the first chamber exceeds a first set pressure.

3. The system of claim 1, wherein the pneumatic feedback system comprises:

a feedback flow passage connecting the downstream portion of the flow passage to the second pressure chamber; and a pressure drop component so that the feedback flow passage feeds a pressure less than the downstream pressure to the second pressure chamber to couple valve position to the pressure in the downstream portion of the flow passage.

4. The system of claim 3, wherein the pressure drop component comprises:

a first restriction in the feedback flow passage;

a second restriction in the feedback flow passage; and an opening to an ambient pressure area.

5. The system of claim 3, wherein the pressure drop component comprises a precooler heat-exchanger located in the downstream portion of the flow passage.

6. The system of claim 1, further comprising:

a solenoid controlled valve including an inlet and first and second outlets, the inlet being coupled to the actuator flow passage, the first outlet being in fluid communication with the first chamber and the second outlet being in fluid communication with an ambient pressure area;

a solenoid latch that causes a stopping element to allow fluid flow from the inlet to the first outlet in a first state and that causes the stopping element to block fluid from at the inlet in a second state.

7. The system of claim 6, wherein the fluid flows from the first chamber through the second outlet to the ambient pressure area when the solenoid latch is in the second state.

8. The system of claim 1, wherein the pressure in the first pressure chamber acts as an opening force on the valve.

9. The system of claim 1, wherein the pressures in the second pressure chamber and the third pressure chamber act as closing forces on the valve.

10. The system of claim 1, wherein the valve is a butterfly valve.

* * * * *